US008566110B2

(12) United States Patent
Locker et al.

(10) Patent No.: US 8,566,110 B2
(45) Date of Patent: Oct. 22, 2013

(54) METHOD AND APPARATUS FOR MANAGING USER TIME ON A RENTAL COMPUTER

(75) Inventors: Howard Jeffrey Locker, Cary, NC (US); Daryl Carvis Cromer, Cary, NC (US); Randall Scott Springfield, Chapel Hill, NC (US); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2675 days.

(21) Appl. No.: 11/403,752

(22) Filed: Apr. 13, 2006

(65) Prior Publication Data
US 2007/0244708 A1    Oct. 18, 2007

(51) Int. Cl.
*G06Q 10/00* (2012.01)

(52) U.S. Cl.
USPC ............................ 705/1.1; 705/307; 340/5.42

(58) Field of Classification Search
USPC .......................................................... 705/1
See application file for complete search history.

(56) References Cited

U.S. PATENT DOCUMENTS

| | | | |
|---|---|---|---|
| 3,518,633 A | 6/1970 | Croy | |
| 5,345,902 A * | 9/1994 | Kalail et al. | 123/198 B |
| 5,613,089 A | 3/1997 | Hornbuckle | 711/164 |
| 5,623,637 A | 4/1997 | Jones et al. | 711/164 |
| 5,636,281 A | 6/1997 | Antonini | 705/55 |
| 5,898,778 A | 4/1999 | Antonini | 705/56 |
| 5,920,850 A * | 7/1999 | Hunter et al. | 705/405 |
| 5,963,142 A | 10/1999 | Zinsky et al. | 340/5.74 |
| 6,012,145 A | 1/2000 | Mathers et al. | 713/202 |
| 6,145,053 A | 11/2000 | Smith | 711/112 |
| 6,480,097 B1 | 11/2002 | Zinsky et al. | 340/5.8 |
| 6,601,152 B1 | 7/2003 | Uchida | 711/164 |
| 6,618,810 B1 | 9/2003 | Dirie | 713/201 |
| 6,931,503 B1 | 8/2005 | Robb et al. | 711/163 |
| 7,647,647 B2 * | 1/2010 | Schultz | 726/29 |
| 2003/0226040 A1 | 12/2003 | Challener et al. | 713/202 |
| 2003/0229798 A1 | 12/2003 | Dastidar et al. | 713/193 |
| 2005/0138396 A1 | 6/2005 | Freeman et al. | 713/188 |

FOREIGN PATENT DOCUMENTS

| | | | | |
|---|---|---|---|---|
| JP | 2003203189 | 7/2003 | | G06F 17/60 |
| JP | 2003288274 | 10/2003 | | G06F 12/14 |
| JP | 2004206184 | 7/2004 | | G06F 11/34 |

* cited by examiner

*Primary Examiner* — Jami A Plucinski
*Assistant Examiner* — Fathi Abdelsalam
(74) *Attorney, Agent, or Firm* — John L. Rogitz

(57) ABSTRACT

Hacking a rental computer to use it beyond purchased rental time is prevented by plugging a time card with internal counter into a DIMM socket of the motherboard and encrypting the register locations of the time card with the private key of the motherboard to bind the time card to the motherboard. Thus, if the time card is not detected at boot or if it is removed during operation the computer is disabled. The counter counts down the rented time period as it receives clocking signals, and at the elapse of the purchased period disables the computer.

13 Claims, 1 Drawing Sheet

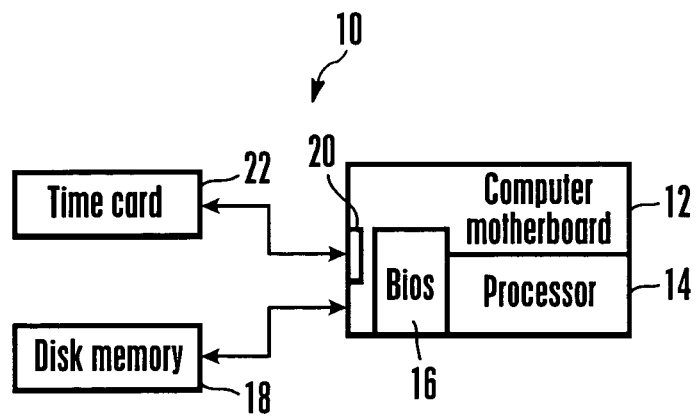
Figure 1
Figure 2
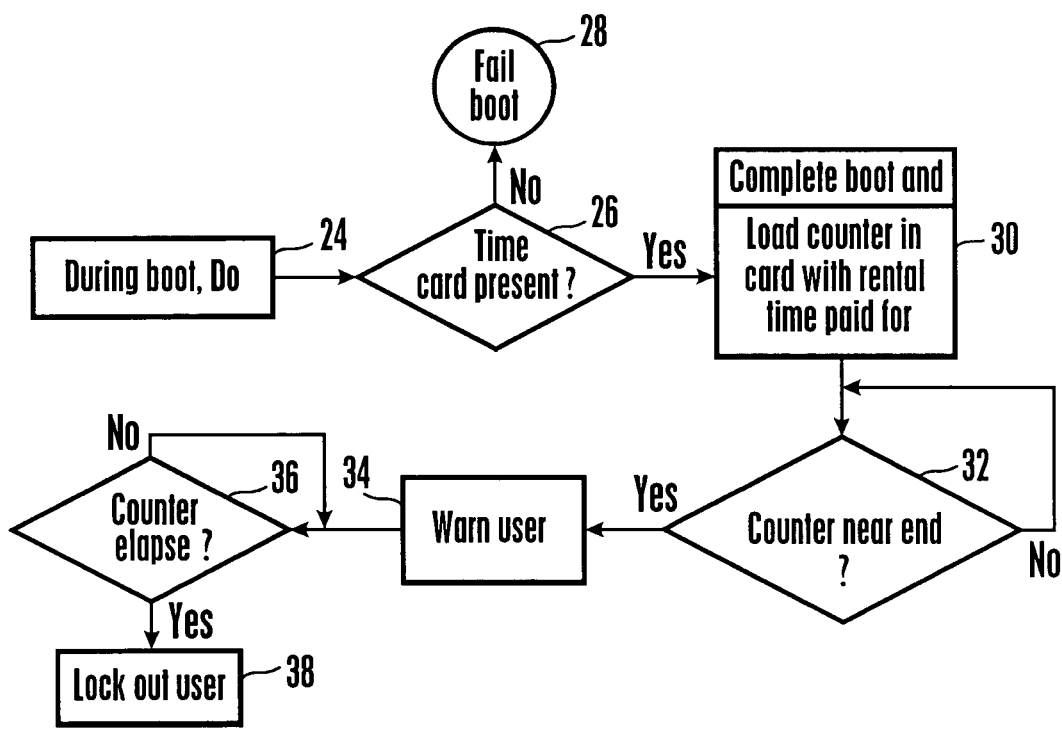

METHOD AND APPARATUS FOR MANAGING USER TIME ON A RENTAL COMPUTER

I. FIELD OF THE INVENTION

The present invention relates generally to rental computers.

II. BACKGROUND OF THE INVENTION

To provide personal computers (PC) to users in emerging countries in which resources may be scarce, the concept of a rental PC has been introduced in which a user pays to use a PC by the month or by access event, spreading the cost of the PC among many months. As understood herein, however, it is important to prevent a user of a rental PC from "cheating" by reducing the time that has been recorded for his usage and thereby improperly use the computer beyond the time he has paid for.

Memory modules, including, e.g., dual in-line memory modules (DIMM) and small outline DIMM (SODIMM), plug in to a PC motherboard to serve as computer memory during operation. As is known in the art, when a computer is turned on, the computer processor invokes a small pre-operating system known as a basic input output system (BIOS). As used herein "BIOS" refers generically to boot loading systems including the uEFI system (Unified Extensible Firmware Interface) that is stored in solid state memory of the computer to in turn copy a larger operating system such as Windows (a trademarked name) or Linux and user applications and data from a hard disk drive into the memory of the computer, which memory can be established by the above-mentioned memory modules. The present invention critically recognizes that memory module sockets can also be used to securely manage the time that a renter uses the computer.

SUMMARY OF THE INVENTION

A method for a computer having a motherboard and a time card having a counter and plugged into a memory socket of the motherboard includes incrementing the counter to reflect purchased rental time, and permitting operation of the computer until the counter reaches a predetermined value.

In some implementations, if, during boot, a processor associated with the motherboard does not detect the time card, booting is not completed. The method can include encrypting, with a private key of the computer motherboard, information related to the time card to thereby bind the time card to the motherboard. The socket may be an in-line memory module socket such as a DIMM socket. The counter can be incremented in response to a user purchasing additional time, and the time card can receive clocking signals that decrement the counter during use. The counter can be used to generate a warning signal that rental time is about to elapse when the counter reaches a predetermined value.

In another aspect, a method includes plugging a time card having a counter into a DIMM socket of a computer motherboard. The counter is configured to be incremented to reflect purchased rental time and to be decremented in response to clocking signals. The method also includes encrypting, with a private key of the computer motherboard, information related to the time card.

In still another aspect, a computer system includes a motherboard, a memory card socket on the mother board, and a time card plugged into the socket. The time card has a counter configured to be incremented to reflect purchased rental time and to be decremented in response to clocking signals. A boot loader is configured to decrypt encrypted information related to at least one register address of the time card.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting system in accordance with the invention; and FIG. 2 is a flow chart of a non-limiting implementation of the logic.

DETAILED DESCRIPTION OF THE PREFERRED EMBODIMENT

FIG. 1 shows that a non-limiting computer system 10 in which the present invention may be embodied includes a computer motherboard 12 that supports a processor 14 that can execute a basic input-output system (BIOS) 16 to boot a main operating system from a boot source 18 such as but not limited to a hard disk drive (HDD) into main memory, as might be established by a DIMM. Accordingly, the motherboard 12 has one or more DIMM sockets 20 into which DIMM can be plugged.

In accordance with present principles, a time card 22 is configured to plug into the DIMM socket 20. The time card 22 includes an internal counter that can be incremented by the processor 14 to reflect purchased rental time and that decrements in response to clock signals, such as row address strobe (RAS)/column address strobe (CAS) clock signals, during use. The processor 14 can translate purchased time from hours and minutes to clock cycles and increment the counter with the corresponding number of clock cycles, which are then decremented during use as each RAS/CAS clock signal is received by the card 22.

In the preferred implementation the time card 22 is bound to the motherboard 12 by the supplier of the system 10, so that it cannot be removed and used in another computer. This can be done by, e.g., encrypting the register addresses of the card 22 using the private key of the motherboard 12 at box manufacturing time, as an offline process. This binds the time card 22 to the computer, so that it cannot be removed and used in another computer, and so that if it is removed, the computer will not function properly.

With the above architecture in mind, attention is directed to FIG. 2, which shows logic that can be present on a computer medium (e.g., BIOS 16 or other component) and which can be executed by the processor 14 executing system management interrupt (SMI) BIOS every "X" units of time. Commencing at block 24, during boot the logic determines, at decision diamond 26, whether the time card is present. To undertake this determination, BIOS can use the motherboard key to decrypt the register addresses which were recorded at manufacturing time and, using the decrypted addresses, determine whether the time card is properly present at those addresses. If it is not, the boot fails at state 28, locking out the user.

On the other hand, if the time card is present the logic flows to block 30, wherein the boot is completed and the counter in the time card 22 is loaded by the processor 14 executing an appropriate program (e.g., BIOS) to reflect the amount of time purchased by the renting user. During operation, if the user purchases more time, the counter in the time card 22 is incremented appropriately.

If it is determined at decision diamond 32 that the remaining time available to the user is approaching an end as indicated by a predetermined counter value, a warning can be issued to the user at block 34 to purchase more time. If it is determined at decision diamond 36 that the counter has elapsed, the user is locked out from further operation at block 38 by, for instance, returning to secure BIOS operation. Because the time card 22 is bound to the motherboard 12, should a user attempt to remove it during operation, the computer will be disabled because the processor 14 will hang when the memory card is removed. Specifically, the computer hangs because removing the card causes unstable addresses on the processor bus, and, e.g., a memory dump with blue screen will be presented to the user in response. The computer returns to BIOS under such conditions and looks for the memory card to be returned to its socket.

While the particular METHOD AND APPARATUS FOR MANAGING USER TIME ON A RENTAL COMPUTER is herein shown and described in detail, it is to be understood that the present invention is to be limited by nothing other than the appended claims.

What is claimed is:

1. A method for a computer having a motherboard and a time card having a counter and plugged into a memory socket of the motherboard, comprising:
   using a computer processor to alter a value of the counter to reflect purchased rental time;
   responsive to a determination that the time card is plugged into the memory socket based at least in part on a register address, booting a main operating system into a main memory; and
   permitting operation of the computer until the counter reaches a predetermined value, wherein if during boot a processor associated with the motherboard does not detect the time card, booting is not completed.

2. The method of claim 1, comprising encrypting, with a private key of the computer motherboard, information related to the time card.

3. The method of claim 1, wherein the socket is an in-line memory module socket.

4. The method of claim 1, comprising incrementing the counter in response to a user purchasing additional time.

5. The method of claim 1, comprising generating a warning signal that rental time is about to elapse when the counter reaches a predetermined value.

6. The method of claim 1, wherein the time card receives clocking signals and the counter is decremented in response thereto.

7. A method for a computer having a motherboard and a time card having a counter and plugged into a memory socket of the motherboard, comprising:
   using a computer processor to alter a value of the counter to reflect purchased rental time;
   responsive to a determination that the time card is plugged into the memory socket based at least in part on a register address, booting a main operating system into a main memory; and
   permitting operation of the computer until the counter reaches a predetermined value, wherein if the time card is removed from the socket during computer operation, the computer returns to a boot loader operating system.

8. A computer system, comprising:
   a motherboard;
   a memory card socket on the mother board;
   a time card plugged into the socket, the time card having a counter configured to be changed to reflect a purchased rental time and to be changed in response to clocking signals; and
   a boot loader configured to decrypt encrypted information related to the time card, wherein if the time card is removed from the socket during computer operation, the computer returns to a boot loader operating system.

9. The system of claim 8, comprising a processor associated with the motherboard for incrementing the counter to reflect purchased rental time and for permitting operation of the computer until the counter reaches a predetermined value.

10. A computer system, comprising:
    a motherboard;
    a memory card socket on the mother board;
    a time card plugged into the socket, the time card having a counter configured to be changed to reflect a purchased rental time and to be changed in response to clocking signals; and
    a boot loader configured to decrypt encrypted information related to the time card, wherein if during boot a processor associated with the motherboard does not detect the time card, the processor ensures that booting is not completed.

11. The system of claim 8, wherein the socket is a DIMM socket or a SODIMM socket.

12. The system of claim 8, wherein a processor associated with the motherboard increments the counter in response to a user purchasing additional time.

13. The system of claim 8, a processor associated with the motherboard generates a warning signal that rental time is about to elapse when the counter reaches a predetermined value.

* * * * *